US011115931B2

(12) United States Patent
Vivanco et al.

(10) Patent No.: US 11,115,931 B2
(45) Date of Patent: *Sep. 7, 2021

(54) UPLINK INTERFERENCE AVOIDANCE UNDER CLOSED LOOP POWER CONTROL CONDITIONS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Arthur Brisebois, Cumming, GA (US); David Ross Beppler, Duluth, GA (US); Thomas Henderson, Alpharetta, GA (US)

(73) Assignees: AT&T INTELLECTUAL PROPERTY I, L.P., Atlanta, GA (US); AT&T TECHNICAL SERVICES COMPANY, INC., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,213

(22) Filed: Jul. 15, 2020

(65) Prior Publication Data

US 2020/0344696 A1 Oct. 29, 2020

Related U.S. Application Data

(63) Continuation of application No. 16/388,769, filed on Apr. 18, 2019, now Pat. No. 10,757,655.

(51) Int. Cl.
*H04W 52/08* (2009.01)
*H04W 52/14* (2009.01)
(Continued)

(52) U.S. Cl.
CPC ......... *H04W 52/08* (2013.01); *H04W 52/146* (2013.01); *H04W 52/243* (2013.01); *H04W 52/265* (2013.01); *H04W 52/286* (2013.01)

(58) Field of Classification Search
CPC . H04W 52/08; H04W 52/146; H04W 52/243; H04W 52/265; H04W 52/286
(Continued)

(56) References Cited

U.S. PATENT DOCUMENTS 6,760,596 B1 * 7/2004 Fiorini .................. H04W 28/18
455/522
7,010,320 B2 * 3/2006 Komatsu ............. H04W 52/223
455/522
(Continued)

FOREIGN PATENT DOCUMENTS

CN 102333377 A1 1/2012
KR 101659692 B1 9/2016
WO 2012/171093 A1 12/2012

OTHER PUBLICATIONS

Non-Final Office Action received for U.S Appl. No. 16/388,769 dated Nov. 29, 2019, 46 pages.
(Continued)

*Primary Examiner* — Hai V Nguyen
(74) *Attorney, Agent, or Firm* — Amin, Turocy & Watson, LLP

(57) ABSTRACT

Various embodiments disclosed herein provide for facilitating uplink interference avoidance. According an embodiment, a system can comprise receiving a request to adjust an uplink power limit of a first communication device that is generating an uplink interference above a threshold and a power adjustment value employable to adjust the uplink power limit of the first communication device. The system can further facilitate identifying a packet flow in an uplink communication with the first communication device,
(Continued)

wherein use of the packet flow results in generating of the uplink interference above the threshold. The system can further facilitate determining whether the uplink power limit of the first communication device is able to be adjusted based on a quality of service allocated to the packet flow. The system can further facilitate transmitting a message to update the uplink power limit of the first communication device using the power adjustment value.

20 Claims, 12 Drawing Sheets

(51) Int. Cl.
 *H04W 52/28* (2009.01)
 *H04W 52/26* (2009.01)
 *H04W 52/24* (2009.01)
(58) Field of Classification Search
 USPC .......................................................... 455/522
 See application file for complete search history.

(56) References Cited

U.S. PATENT DOCUMENTS

| | | | | |
|---|---|---|---|---|
| 7,035,661 B1* | 4/2006 | Yun | ........................ | H04W 52/42 370/277 |
| 7,376,390 B2* | 5/2008 | Hayashi | ................. | H04W 52/16 370/328 |
| 7,408,880 B2* | 8/2008 | Xiao | ...................... | H04L 1/0015 370/235 |
| 7,411,918 B2* | 8/2008 | Zhang | .................... | H04W 72/02 370/252 |
| 7,483,712 B2* | 1/2009 | Komatsu | ............. | H04W 52/223 455/522 |
| 7,554,954 B2* | 6/2009 | Hosein | ................... | H04L 1/0002 370/335 |
| 7,577,456 B2* | 8/2009 | Gunnarsson | ........ | H04W 52/146 455/522 |
| 7,627,347 B2* | 12/2009 | Codreanu | ........... | H04W 52/146 455/403 |
| 7,907,915 B2* | 3/2011 | Cho | ...................... | H04W 52/10 455/69 |
| 8,014,811 B2* | 9/2011 | Sahara | ................. | H04W 52/262 455/522 |
| 8,098,644 B2* | 1/2012 | Xiao | ................... | H04W 52/242 370/344 |
| 8,134,980 B2* | 3/2012 | Proctor, Jr. | ............ | H04L 1/165 370/335 |
| 8,155,096 B1* | 4/2012 | Proctor, Jr. | .......... | H04B 7/0408 370/342 |
| 8,285,319 B2 | 10/2012 | Shin et al. | | |
| 8,812,046 B2* | 8/2014 | Huang | .................. | H04B 7/024 455/522 |
| 8,842,602 B2 | 9/2014 | Koo et al. | | |
| 8,929,880 B2 | 1/2015 | Ratasuk et al. | | |
| 8,934,362 B2* | 1/2015 | Hsu | ..................... | H04W 52/243 370/252 |
| 9,019,905 B2* | 4/2015 | Kazmi | ................ | H04W 52/247 370/329 |
| 9,042,894 B2* | 5/2015 | Zhou | ..................... | H04W 36/20 455/436 |
| 9,042,925 B2* | 5/2015 | Seo | ........................ | H04L 1/1854 455/501 |
| 9,078,220 B2 | 7/2015 | Makhlouf et al. | | |
| 9,220,072 B2* | 12/2015 | Hsu | .................... | H04W 52/367 |
| 9,491,780 B2* | 11/2016 | Pang | ................. | H04W 74/0833 |
| 9,510,301 B2* | 11/2016 | Chen | ..................... | H04W 52/26 |
| 9,525,923 B2* | 12/2016 | Proctor, Jr. | .......... | H04W 76/27 |
| 9,629,096 B2* | 4/2017 | Claussen | ............ | H04W 52/146 |
| 9,655,055 B2* | 5/2017 | Morita | ............... | H04W 52/146 |
| 9,813,954 B2* | 11/2017 | Ji | ..................... | H04W 36/00837 |
| 9,819,470 B2* | 11/2017 | Fodor | ................... | H04L 5/0062 |
| 9,907,028 B1* | 2/2018 | Azem | .................... | H04W 24/08 |
| 9,985,738 B2* | 5/2018 | Zhou | .................... | H04W 36/08 |
| 10,009,904 B2 | 6/2018 | Wang et al. | | |
| 10,070,397 B2 | 9/2018 | Shin et al. | | |
| 10,117,256 B2 | 10/2018 | Olfat et al. | | |
| 10,117,257 B1* | 10/2018 | Naim | .................... | H04L 5/0062 |
| 10,165,483 B1* | 12/2018 | Liu | ....................... | H04W 52/244 |
| 10,187,881 B2* | 1/2019 | Xu | ........................ | H04W 24/08 |
| 10,244,540 B2* | 3/2019 | Sundararajan | ...... | H04W 72/082 |
| 10,264,534 B1* | 4/2019 | Park | .................... | H04W 52/265 |
| 10,425,901 B2* | 9/2019 | Islam | ................ | H04W 74/0833 |
| 10,455,520 B2* | 10/2019 | Kosseifi | .............. | H04W 52/283 |
| 10,757,655 B1* | 8/2020 | Vivanco | ................ | H04W 52/08 |
| 2003/0125068 A1* | 7/2003 | Lee | ...................... | H04W 52/267 455/522 |
| 2004/0018850 A1* | 1/2004 | Ishiguro | .............. | H04W 52/325 455/522 |
| 2005/0249149 A1* | 11/2005 | Kasturi | ................ | H04W 52/367 370/328 |
| 2007/0218950 A1* | 9/2007 | Codreanu | ............ | H04W 52/42 455/562.1 |
| 2008/0146154 A1* | 6/2008 | Claussen | ............. | H04W 52/146 455/63.1 |
| 2009/0109939 A1* | 4/2009 | Bhushan | .............. | H04W 72/082 370/337 |
| 2009/0318152 A1* | 12/2009 | Maheshwari | ......... | H04L 1/1835 455/436 |
| 2010/0087221 A1 | 4/2010 | Srinivasan et al. | | |
| 2010/0330919 A1 | 12/2010 | Gurney et al. | | |
| 2011/0105110 A1* | 5/2011 | Carmon | .............. | H04W 52/244 455/422.1 |
| 2011/0222452 A1* | 9/2011 | Jeong | .................... | H04L 1/0034 370/311 |
| 2012/0087306 A1* | 4/2012 | Kim | .................... | H04W 52/367 370/328 |
| 2012/0176923 A1* | 7/2012 | Hsu | ..................... | H04W 52/243 370/252 |
| 2012/0178482 A1* | 7/2012 | Seo | ........................ | H04L 1/1854 455/501 |
| 2012/0309394 A1* | 12/2012 | Radulescu | ........ | H04W 36/0058 455/436 |
| 2013/0176874 A1* | 7/2013 | Xu | ..................... | H04W 52/242 370/252 |
| 2013/0322364 A1* | 12/2013 | Tsai | ..................... | H04B 17/309 370/329 |
| 2013/0322374 A1* | 12/2013 | Cai | .................... | H04W 52/244 370/329 |
| 2014/0036786 A1* | 2/2014 | Kazmi | ................ | H04W 52/146 370/329 |
| 2014/0241285 A1* | 8/2014 | Pang | ................. | H04W 74/0833 370/329 |
| 2014/0256322 A1* | 9/2014 | Zhou | .................... | H04W 36/20 455/436 |
| 2015/0011229 A1* | 1/2015 | Morita | ................ | H04W 52/146 455/448 |
| 2015/0018028 A1* | 1/2015 | Uplenchwar | ....... | H04W 52/143 455/522 |
| 2015/0057011 A1* | 2/2015 | Di Girolamo | ........ | H04W 16/14 455/454 |
| 2015/0110023 A1* | 4/2015 | Pan | ..................... | H04W 52/244 370/329 |
| 2015/0119098 A1* | 4/2015 | Hsu | ..................... | H04W 52/367 455/522 |
| 2015/0244487 A1* | 8/2015 | Zhou | .................... | H04W 52/244 370/329 |
| 2017/0064638 A1* | 3/2017 | Li | ....................... | H04W 52/243 |
| 2017/0164375 A1* | 6/2017 | Sundararajan | ...... | H04W 72/082 |
| 2017/0188314 A1* | 6/2017 | Mueck | .................. | H04W 24/02 |
| 2017/0215228 A1* | 7/2017 | Radulescu | .......... | H04W 84/045 |
| 2018/0013594 A1* | 1/2018 | Mukkavilli | ........... | H04W 16/14 |
| 2018/0376429 A1* | 12/2018 | Islam | ................... | H04W 52/242 |
| 2019/0045457 A1* | 2/2019 | Islam | ................... | H04W 52/325 |
| 2019/0141639 A1* | 5/2019 | Rahman | ................ | H04W 52/54 |
| 2019/0165827 A1 | 5/2019 | Churan | | |
| 2019/0174576 A1* | 6/2019 | Palat | .................... | H04W 80/06 |
| 2019/0191381 A1* | 6/2019 | Zhang | ................... | H04W 52/42 |
| 2019/0230597 A1* | 7/2019 | Akkarakaran | ...... | H04W 52/325 |

(56) References Cited

U.S. PATENT DOCUMENTS

| | | |
|---|---|---|
| 2019/0261234 A1* | 8/2019 | Park .................. H04W 36/0069 |
| 2019/0297583 A1* | 9/2019 | Lin ....................... H04W 52/10 |
| 2020/0229107 A1 | 7/2020 | Venkatasubramanian et al. |

OTHER PUBLICATIONS

Notice of Allowance received for U.S. Appl. No. 16/388,769 dated Apr. 16, 2020, 57 pages.
Notice of Allowance received for U.S. Appl. No. 16/428,851 dated Feb. 17, 2021, 44 pages.

* cited by examiner

UPLINK INTERFERENCE AVOIDANCE UNDER CLOSED LOOP POWER CONTROL CONDITIONS

RELATED APPLICATION

The subject patent application is a continuation of, and claims priority to, U.S. patent application Ser. No. 16/388,769 (now U.S. Pat. No. 10,757,655), filed Apr. 18, 2019, and entitled "UPLINK INTERFERENCE AVOIDANCE UNDER CLOSED LOOP POWER CONTROL CONDITIONS," the entirety of which application is hereby incorporated by reference herein.

TECHNICAL FIELD

This disclosure relates generally to a wireless communication system in general, and to a fifth generation (5G) wireless communication systems power control. More specifically, facilitating uplink interference avoidance under closed loop power control conditions.

BACKGROUND

5th generation (5G) wireless systems represent a next major phase of mobile telecommunications standards, also called new radio (NR) access, beyond the current telecommunications standards of 4th generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

In wireless systems, it is often required to either increase or decrease the transmit power of UE or mobile device. This is known as uplink power control. Transmit power is increased to meet required SNR or BER at the gNB (or base station or eNB). Transmit power is decreased to minimize co-channel interference of the 5G system. There are two types of power controls i.e. open loop power control and closed loop power control.

In a wireless system that is operating adjacent or within a vicinity of an external system, it is often required to adjust uplink power control (e.g., UE transmit power) to maintain signal-to-interference-plus-noise ratio (SINR). UE transmit power is decreased to lower a co-channel interference to a 5G system or other systems (e.g., government communication system adjacent to the 5G system). There are two types of power controls (e.g., open loop power control and closed loop power control). An open loop power control does not use feedback between base station and mobile station to adjust transmit power the mobile station. The closed loop power control uses a feedback between the base station and mobile station to adjust the transmit power of mobile station.

The above-described background relating to facilitating uplink interference avoidance under closed loop power control conditions is merely intended to provide a contextual overview of some current issues and is not intended to be exhaustive. Other contextual information may become apparent upon further review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
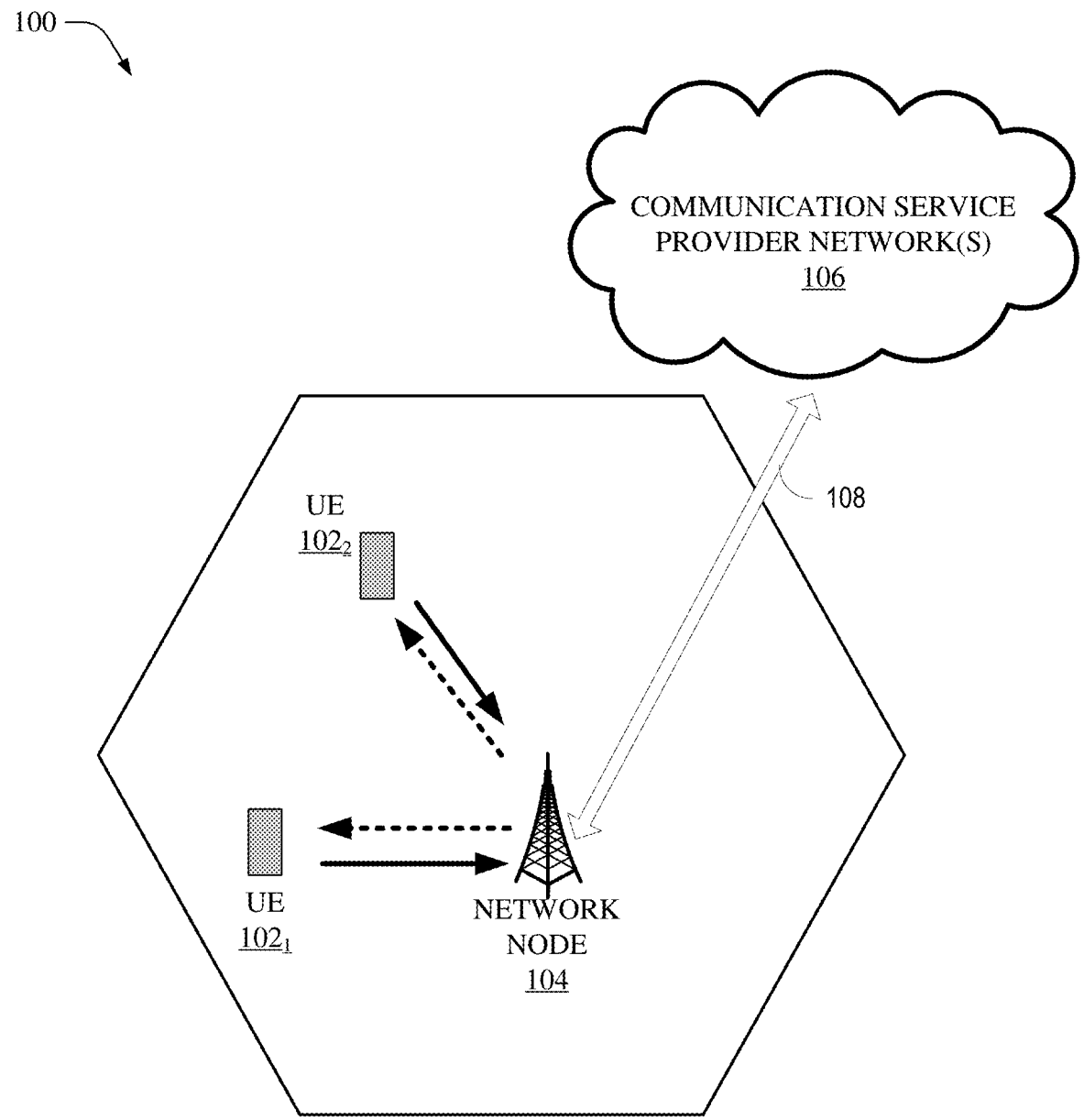
FIG. 1 illustrates a non-limiting example of a wireless communication system in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a discontinuous access to unlicensed spectrum in a new radio access environment. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a discontinuous access to unlicensed spectrum in a new radio access environment. Facilitating a discontinuous access to unlicensed spectrum can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

The Federal Communications Commission (FCC) reallocated the 1755-1780 MHz band for Advanced Wireless Services (AWS). The rules provide commercial access to new spectrum bands through a spectrum-sharing arrangement with incumbent federal users in accordance with the procedures set forth by the FCC and the National Telecommunications and Information Administration (NTIA). The commercial systems operating in the AWS-3 band are expected to employ LTE (3GPP Release 8+). Protection Zones were defined as areas where Federal Services (e.g., Satellites) have been deployed. US wireless operators should limit their Wireless AWS-3 services in protection zones to avoid interference with federal services.

In some embodiments, wireless systems can use Open Loop Power Control (OLPC) and Closed Loop Power Control (CLPC) to control UE uplink power. According to some embodiments, according to OLPC, UE determines its transmission power by its own power setting algorithm. This power setting algorithm takes in many inputs, which includes UE internal settings and UE measurements. There is no feedback input from eNB. According to some embodiments, according to (CLPC), similar mechanism may be employed by OLPC to determine the initial power that UE needs to communicate with the eNB. Then, UE transmission power is controlled dynamically by some feedback input from eNB. eNB feedback is known as Transmission Power Control (TPC) commands.

In some embodiments, UE transmission power changes dynamically based on various factors, for example but not limited to:

1. Assigned MCS; UE assigned to poor MCS (QPSK) may needs higher TX power than one assigned to good MCS (64QAM);
2. UE traffic demand; UE engaged in heavy traffic (e.g., HD video conference) may need higher TX power than one engaged in light traffic (e.g., voice call);
3. Network Morphology; UE located in Urban environment may require higher TX power than one locate in a rural environment;
4. Network design; UE located in a network with large Inter-Site-Distance may require higher TX power;
5. Power Control and OLPC/CLPC settings; and/or
6. Path loss between the UE and base station, which can vary according to frequency, distance, objects in the path and the composition of objects in the path In some embodiments, the algorithm used for OLPC is:

$$P_{PUSCH} = \min\{P_{max}, 10 \cdot \text{Log}_{10} M + P_0 + \alpha * PL + \delta_{mcs}\} \; [\text{dBm}].$$

In some embodiments, the algorithm used for CLPC is:

$$P_{PUSCH} = \min\{P_{max}, 10 \cdot \text{Log}_{10} M + P_0 + \alpha * PL + \delta_{mcs} + f(\Delta_i)\}[\text{dBm}]$$

In some embodiments, LTE UE transmit power for PUSCH (channel or Physical Uplink Shared Channel) is defined as:

$$P_{PUSCH} = \min\{P_{max}, 10 \cdot \text{Log}_{10} M + P_0 + \alpha * PL + \delta_{mcs} + f(\Delta_i)\}[\text{dBm}]$$

wherein, $P_{PUSCH}$: Power that the UE uses to transmit user data in the uplink channel.
$P_{max}$: Maximum allowed transmit power (e.g., 23 dbm)
M: # of physical resource blocks (PRB) utilized to transmit UE data;

P_0: Cell/UE-specific parameter signaled by the radio resource control (RRC). Typical value of $P_0$=−90 dbm ∝: Path loss compensation factor. ∝ is in the range [0 1] and signaled by the RRC. Typical value of c=0.8

PL: Downlink path loss estimate by UE based on the measured and reported RSRP.

$\delta_{mcs}$: a UE-specific MCS-dependent power offset. It reflects the different SINR requirements per MCS.

f ($\Delta_i$): UE specific, aka TPC. TPC (Transmit Power Control) is a closed loop correction value. It is used to compensate variations on the signal and interference powers in order to guarantee a desirable communication quality level.

$$P_o = \alpha * (SNR_0 + P_n) + (1-\alpha) * (P_{max} - 10 \cdot Log_{10} M_o) [dBm]$$
where;

$SNR_0$ is the open-loop target SNR.

$P_n$ is the noise power per PRB.

$M_o$ defines the number of PRBs for which the SNR target is reached with full power.

In some embodiments, eNB uses Power Headroom Report (PHR) sent by the UE to estimate how much transmission power left for a UE to use, wherein the PHR=UE Max Transmission Power—PUSCH Power. In some embodiments, PHR are sent periodically based on a timer.

In some embodiments, for open loop power control, the eNBs mandate that the maximum UL power LTE that UEs can use (P_MAX). For example, the maximum allowed P_MAX is 23 dbm. PMAX value comes in the System Information Block Type 1 (SIB1) messages, which is broadcast to all UEs periodically. However, UE only read SIB1 during the initial attach (e.g., establishing the initial communication link with eNB) procedure. In some embodiments, when eNB needs to notify network/setting changes to its UEs, the eNB transmits a paging message with systemInfoModification=true. Thereafter, the eNB transmits an updated SIB1 (e.g., P_MAX=20 dbm). The Paging message is used to inform UEs in RRC_IDLE and UEs in RRC_CONNECTED about a system information change. UE then reads and decodes the new SIB1 message and change its setting accordingly.

In some embodiments, a commercial LTE system uses CLPC as UE uplink transmit power control mechanism and a centralized control element, such as self-organized network (SON) to collect network measurements and control network elements (e.g., eNB, MME, SGW). In some embodiments, the SON is a network intelligence and automation platform used to improve deployment and performance in complex LTE networks. Also, SON is a part of the 3GPP Release 8+ standards.

In some embodiments, a system to reduce LTE Uplink interference into external system that shares the same UL frequency band is described herein. In some embodiments, a system is provided that resides in a centralized network element (such as SON). The system has knowledge of LTE network topology information and location of the external (e.g., DoD) system. The system selects a group of eNB in the vicinity of the external system which may create UL interference. The system collects measurements, key-performance-indicators and/or settings corresponding to these eNBs. The system also collects corresponding traffic profile, and user behavior from other networks elements (e.g., Deep Packet Inspection (DPI)) for the UEs connected to these eNBs. The system also estimates the total LTE UL interference into the external system, based on propagation models and the estimated amount of UE UL Transmit Power from the steps above. The system adjust CLPC-TPC commands to reduce LTE Interference in eNB/UE level based on estimated total LTE UL interference generated into external system, while maintaining UE quality of experience.

In some embodiments, Aggregated UL power from all the UEs connected to $eNB_j$:

$$ULPower_{eNB_j} = \tau ULPower_{UE_i}$$

wherein the $ULPower_{eNB_j}$ represents the concurrent UL power of all UEs connected to eNB (UEs engaged into UL traffic simultaneously). In some embodiments, the total UL aggregated interferences received at external system from all eNBs nearby can be calculated by:

$$TotalULAggregatedInterference = \Sigma Interference_{eNB_j}$$

wherein the $Interference_{eNB_j}$ is the radio propagation model (e.g., Hata Model) of $ULPower_{eNB_j}$ into the external system.

In some embodiments, a method is provided to facilitate avoidance of uplink interference under closed loop power control conditions. The method can identify the eNBs that may create UL interference into external system based on location. The method can collect and adjust power settings of the identified eNBs. The method can collect PHR for all active UE connected to the eNBs. The method can collect radio information (i.e. MCS, RSRP, RSRQ) from all active UEs connected to the eNBs identified. The method can collect traffic profile information (i.e. traffic information=video), and QoS information from the active UEs connected to the eNBs. The method can estimate average $ULPower_{eNB_j}$ using info collected above. The method can calculate TotalULAggregatedInterference into the external system based on aggregated power head room (PHR) and propagation models. If TotalULAggregatedInterference is greater than maximum acceptable, then the method can use traffic profile information and QoS information from the active UEs connected to the eNBs to determine which UEs to reduce $ULPower_{UE_i}$ and how much, aiming to reduce TotalULAggregatedInterference, while maintaining appropriate user experience. As an example, UE1 engaged in Video Conference/High-QoS @UL_TX:23 dbm. UE2 engaged in P2P/Low-QoS @UL_TX:23 dbm. Algorithm decides to reduce UL_TX for UE2 @10 dbm, this may reduce UL data rate for this UE significantly. UL_TX for UE1 @ 21 dbm, this may reduce UL data rate for this UE slightly. The method can mandate eNB to transmit the appropriate (e.g., reduced) $ULPower_{UE_i}$ to each UE based on independent TPC commands send from each eNB. The method can adjust TPC commands based on observations (e.g., evaluating the type of application in use and quality of service class indicator value or the DPI value).

In some embodiments, an interference aware UL scheduling may be employed in addition or in combinations with techniques discussed above, to reduce the interference into external system. In some embodiments, according to interference aware UL scheduling, the eNB measures the interference plus noise power distribution over the PUSCH spectrum. Based on these measurements the interference aware UL scheduler arranges the UL PRB allocation of the UEs in the frequency domain so that the interference to the adjacent external system is reduced (e.g., minimized or mitigated) below a desired threshold. This technique can help to offset the impact of UE transmit power limitations by placing power-limited UE transmissions on the PUSCH PRBs with the least uplink interference (therefore least UE power required). In some embodiments, traffic management may be employed, wherein traffic management techniques involve handover of some UEs to other frequency bands. UE selection for inter-frequency handover is based on the amount of transmit power that UE is emitting.

For example, using interference aware UL scheduling to arrange the UL PRB allocation of the UEs in a way to reduce interference to external system (to the extent possible). In some embodiments, if this solution cannot guarantee a maximum allowed interference into external system, then the system can use the proposed OLPC algorithm (described above) to further reduce the interference into external system based on independent SIB1 messages (with different P_MAX values) broadcast from each eNB to all its connected UEs. In some embodiments, if this solution cannot guarantee a maximum allowed interference into external system, the system can use traffic management techniques to handover heavy UEs (high UL-TX power) to other frequency bands or other sites.

In some embodiments, additional methods may be employed to reduce interference into the external systems. For example, the system can make use of an AWS-3 carrier as downlink-only S-cell (secondary cell-carrier aggregation) at LTE cells where/when DoD interference is predicted and UE_PMAX is reduced. In this case Asymmetric CA allows UE to receive downlink packets from multiple DL carriers, while maintaining only 1 P-cell for UL (all UL CA carriers are aggregated into 1 Pcell UL Carrier), example 1 (UL+DL) P-cell+4 DL-only S-cells. This allows use of the AWS-3 downlink (does not interfere with external system) without risk of UE uplink interference to external systems. In this case when the AWS-3 uplink is found to be an interference problem for external systems, the eNB can reconfigure the UE to use AWS-3 for downlink only.

In some embodiments, additional methods may be employed to reduce interference into the external systems. For example, the system can utilize Multi-eNB cluster detection and mitigation. For example, for a constellation of eNB surrounding the DOD ground station, each with uplink interference received (at different azimuth and level) from the ground station. The level and direction of received uplink interference can be used to triangulate the DOD ground station, general area and serving eNB with LTE UE to ground station interference risk. This creates a list of eNB serving UE within an "interference zone" around the DOD ground station. These eNB are likely handover neighbors to each other, which means served UE are measuring relative path loss for handovers between these eNB. This relative path loss (from UE handover measurements) can be used to determine when/if the UE is located in the "interference zone" and therefore subject to power restriction, forced handover to other non-interfering frequency band and/or use of AWS-3 as downlink-only S-cell. This capability will require additional logic in the UE and SIB from the eNB.

In some embodiments, the TotalULAggregatedInterference can be mathematically estimated as shown above. However, TotalULAggregatedInterference can also be estimated by means of power reading from eNB/UE. In some embodiments, the system can estimate the eNBs serving UE that may create UL interference into external system based on location and reciprocal uplink interference from the external system ground stations to the eNB. This addresses the reality that it's the served UE (not the eNB) that may create interference for external system (e.g., DOD ground stations). This also includes the use of eNB uplink noise measurements to estimate path loss (therefore interference probability of UE served by the eNB) to the DOD ground station. This reciprocal uplink interference/path loss check is an additional qualifier for eNBs that need to apply interference mitigation algorithms for their served UE. In some embodiments, the solutions described above may be extended to be used on both FDD and TDD technologies.

In some embodiments, interference aware UL scheduling is a type of 3GPP Frequency Selective Scheduling (FSS). FSS leverages the channel's time and frequency selectivity to allocate valuable radio resources in an optimal manner. With interference aware UL scheduling the eNodeB provides improved cell edge performance in UL for low loaded cells. In some embodiments the eNodeB measures the interference plus noise power distribution over the PUSCH spectrum and evaluates the TX power density measurements of the UEs. On basis of these measurements the interference aware UL scheduler arranges the PUSCH (Physical Uplink Shared Channel) PRB allocation of the UEs in the frequency domain so that the resource allocation or rather the interference to the adjacent cells is optimized without the means of eNodeB intercommunication via X2. The separation is achieved by assigning the UEs which have high TX power density to the PUSCH scheduling area which is less affected by interference and noise. In some embodiments, the interference aware UL scheduling is the separation of the PRB allocation in the adjacent cells, in particular the separation of the PRB from UEs generating high intercell interference. The PUSCH is split into PUSCH scheduling areas of approximately equal size. The scheduler defines the best PUSCH scheduling area with respect to the average interference and noise power of the uplink channel. For the selection of the preferred scheduling area, the interference aware UL scheduler evaluates the interference and noise power which is measured per PRB by the physical layer (Layer 1) of the eNodeB. In some embodiments, the power headroom report (PHR) and finally the number of PRBs which are involved by the UL transmission give the information about the TX power density the UE provides for the UL transmission. The power density of the PRB's transmitted by the UE increases proportionally to the distance from the eNodeB and achieves the maximum when the UE is close to the cell edge (the higher the power density the higher the intercell interference the UE contributes to the adjacent cells), thus, the power density provides the parameter the interference aware scheduler requires for the scheduling of the UEs in the frequency domain. The UEs with a higher TX power density are assigned to the preferred scheduling area and the UEs with a lower TX power density are placed in the remaining PUSCH area.

According to an embodiment, a system can comprise a processor and a memory that stores executable instructions that, when executed by the processor, can facilitate performance of operations comprising receiving a request to adjust an uplink power limit (e.g. an uplink power control setting such as maximum uplink transmission power parameter) of a first communication device (e.g., UE) that is generating an uplink interference above a threshold and a power adjustment value (e.g., a value representing amount of adjustment to the uplink power control setting/limit) employable to adjust the uplink power limit of the first communication device. The system can further facilitate identifying a packet flow in an uplink communication with the first communication device, wherein the packet flow results in the generating of the uplink interference above the threshold. The system can further facilitate determining whether the uplink power limit of the first communication device is able to be adjusted based on a quality of service allocated to the packet flow. The system can further facilitate, in response to the determining that the uplink power limit of the first communication device is able to be adjusted, transmitting a message to update the uplink power limit of the first communication device using the power adjustment value.

According to another embodiment, described herein is a method that can comprise receiving, by a system comprising a processor, a request to adjust an uplink power parameter (e.g. an uplink power limit) of a first communication device (e.g. UE) that is generating an interference into an external system and a power adjustment value employed to adjust the uplink power parameter of the first communication device. The method can further comprise identifying, by the system, a packet flow in an uplink communication on the first communication device, wherein engagement of the packet flow is causing the generating of the interference above a threshold. The method can further comprise determining, by the system, whether the uplink power parameter of the first communication device is capable of adjustment based on a quality of service associated with the packet flow. The method can further comprise in response to the determining that the uplink power parameter of the first communication device is not capable of the adjustment, transmitting, by the system, a message to update the uplink power parameter of the first communication device using the power adjustment value.

According to yet another embodiment, machine-readable storage medium, comprising executable instructions that, when executed by a processor, facilitate performance of operations, comprising receiving a request to reduce an uplink power limit of a first communication device (e.g., UE) that is generating an interference into an external system and a power adjustment value to employ to reduce the uplink power limit of the first communication device to facilitate reduction in the interference into the external system. The machine-readable storage medium can further comprise identifying a packet flow associated with generating an uplink communication on the first communication device, wherein use of the packet flow is generating the interference above a threshold. The machine-readable storage medium can further comprise determining whether the uplink power limit of the first communication device is able to be reduced based on a quality of service allocated to the packet flow. The machine-readable storage medium can further comprise in response to the uplink power limit of the first communication device being able to be adjusted, transmitting a message to reduce the uplink power limit of the first communication device using the power adjustment value.

These and other embodiments or implementations are described in more detail below with reference to the drawings.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment (UE) 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosure, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
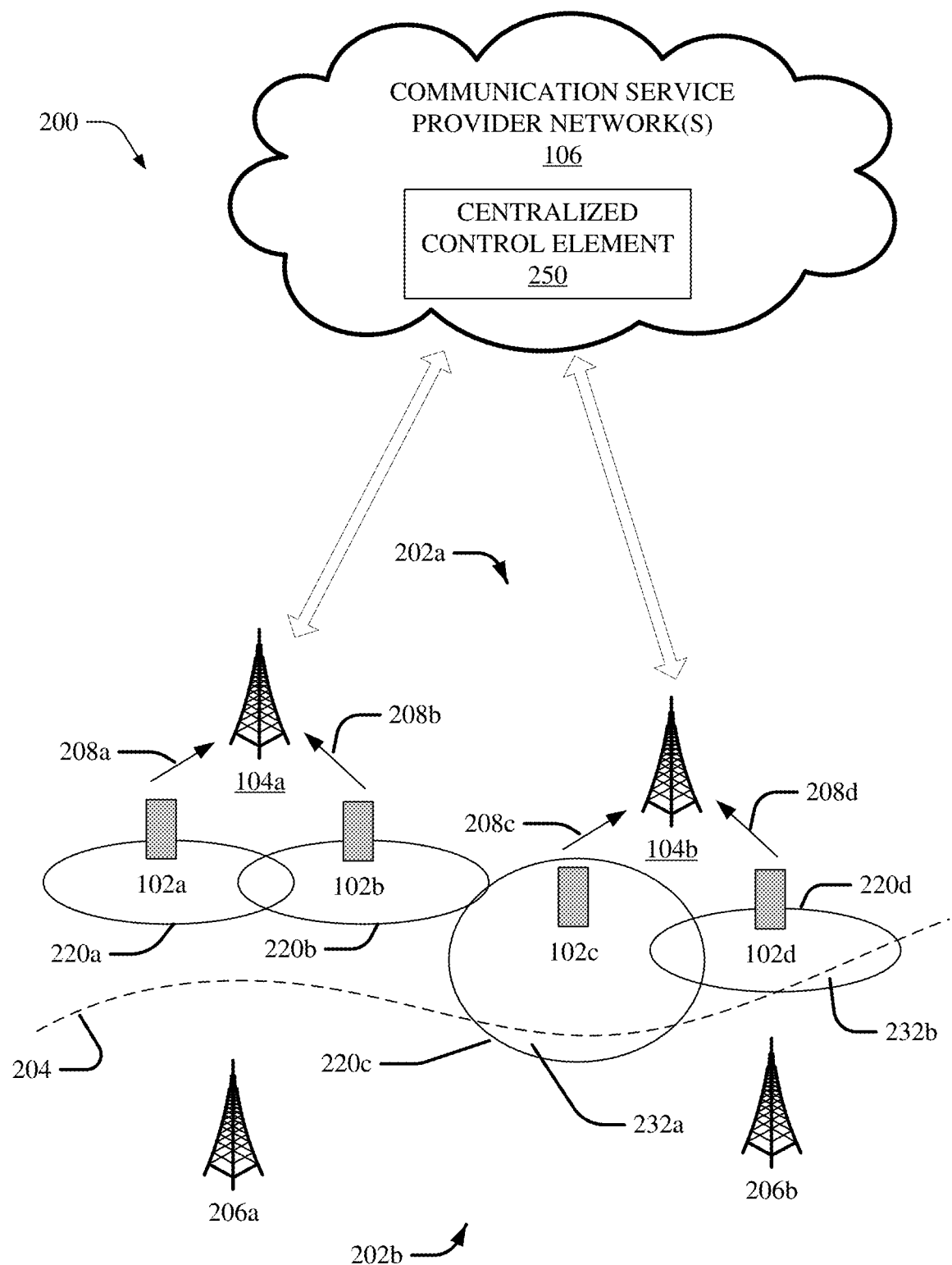
FIG. 2 illustrates a non-limiting example of a wireless communication system in accordance with various aspects and embodiments of the subject disclosure.

FIG. 2 illustrates a non-limiting example of a wireless communication system 200 in accordance with various aspects and embodiments of the subject disclosure. In some embodiments, the 200 can comprise a centralized control element 250 that can be integrated with other components of the communication service provider networks 106. As illustrated, the system comprises a commercial wireless system 202a and an external system 202b (e.g., government system). The commercial wireless system 202a is adjacent to the external system 202b separated by a dashed line 204. In the exemplary illustration, the external system 202b is located in a protected area comprising an eNB-A 206a and an e-NB-B 206b. In some embodiments, as an example, the commercial wireless system 202a comprises the e-NB-1 104a that is communicatively connected and engaged a UE-1 102a and a UE-2 102b, and the e-NB-2 104b that is communicatively connected and engaged with a UE-3 102c and a UE-4 102d. In some embodiments, the UE-1 102a is engaged with the eNB-1 104a using an uplink transmission link 208a that is generating an inference covering area defined by an interference area A 220a; the UE-2 102b is engaged with the eNB-1 104a using an uplink transmission link 208b that is generating an inference covering area defined by an interference area B 220b; the UE-3 102c is engaged with the eNB-2 104b using an uplink transmission link 208c that is generating an inference covering area defined by an interference area C 220c; and the UE-4 102d is engaged with the eNB-2 104b using an uplink transmission link 208d that is generating an inference covering area defined by an interference area D 220d.

In some embodiments, interference generated by UE-3 102c is illustrated by an interference area C 220c and interference generated by UE-4 102d is illustrated by an interference area D 220d extend into the protected area (e.g., external system 202b). Interference area C 220c is extended into external system 202b as illustrated by area A 232a, thereby causing interference into the external system 202b. Interference area D 220d is extended into external system 202b as illustrated by area B 232b thereby causing interference into the external system 202b. As discussed below, the centralized control element 250 can identify the UEs (e.g., UE-3 102c and UE-4 102d) that are causing interference into the external system 202b and request the network node device (e.g., eNB-2) communicatively connected to UE-3 102c and UE-4 102d to adjust their transmit UL power. Upon receiving the request to adjust UEs uplink transmit power, the network node device will initiate adjustment to affected UEs (e.g., UE-3 102c and UE-4 102d) uplink transmit power after determining the type of application being used on the UE.

Figure 3:
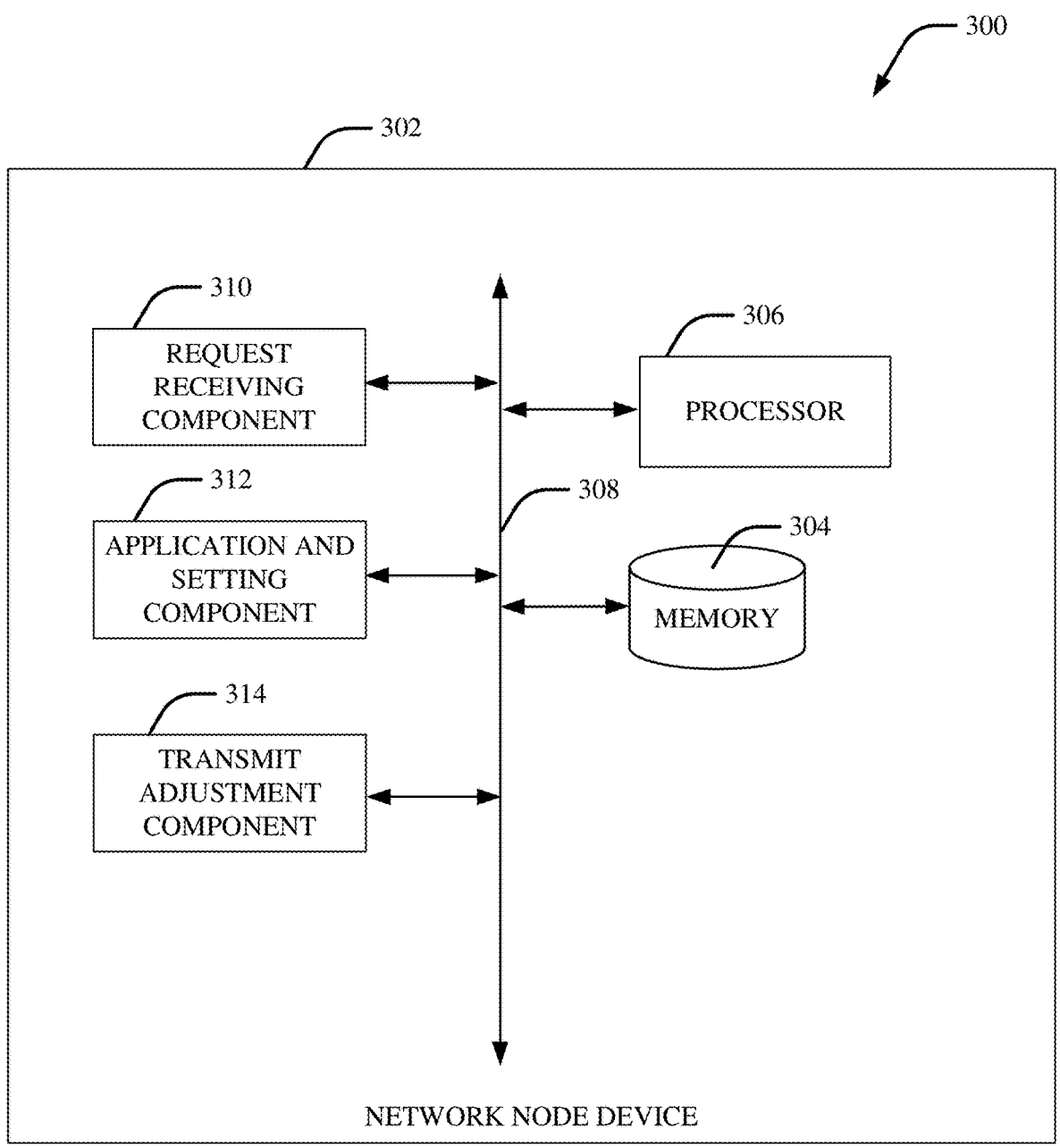
FIG. 3 illustrates a block diagram of an example, non-limiting system that facilitates operation of uplink interference avoidance under open loop power control conditions in accordance with one or more embodiments described herein.

FIG. 3 illustrates a block diagram of an example, non-limiting system 300 that facilitates operation of uplink interference avoidance under open loop power control conditions in accordance with one or more embodiments described herein. Repetitive description of like elements employed in respective embodiments is omitted for sake of brevity. According to some embodiments, the system 300 can comprise a network node device 302. In some embodiments, the network node device 302 can also include or otherwise be associated with a memory 304, a processor 306 that executes computer executable components stored in a memory 304. The network node device 302 can further include a system bus 308 that can couple various components including, but not limited to, a request receiving component 310, an application and setting component 312, and a transmit adjustment component 314.

Aspects of systems (e.g., the network node device 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the network node device 302 can comprise various computer and/or computing-based elements described herein with reference to operating environment 1100 and FIG. 11. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by processor 306, can facilitate performance of operations defined by the executable component(s) and/or instruction(s). For example, the memory 304 can store computer and/or machine readable, writable, and/or executable components and/or instructions that, when executed by the processor 306, can facilitate execution of the various functions described herein relating to the request receiving component 310, the application and setting component 312, and the transmit adjustment component 314.

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 1106 and FIG. 11. Such examples of memory 304 can be employed to implement any embodiments of the subject disclosure.

According to some embodiments, the processor 306 can comprise one or more types of processors and/or electronic circuitry that can implement one or more computer and/or machine readable, writable, and/or executable components and/or instructions that can be stored on the memory 304. For example, the processor 306 can perform various operations that can be specified by such computer and/or machine readable, writable, and/or executable components and/or instructions including, but not limited to, logic, control, input/output (I/O), arithmetic, and/or the like. In some embodiments, processor 306 can comprise one or more central processing unit, multi-core processor, microprocessor, dual microprocessors, microcontroller, System on a Chip (SOC), array processor, vector processor, and/or another type of processor.

In some embodiments, the processor 306, the memory 304 the request receiving component 310, the application and setting component 312, and the transmit adjustment component 314 can be communicatively, electrically, and/or operatively coupled to one another via the system bus 308 to perform functions of the network node device 302, and/or any components coupled therewith. In several embodiments, the system bus 308 can comprise one or more memory bus, memory controller, peripheral bus, external bus, local bus, and/or another type of bus that can employ various bus architectures.

In several embodiments, the network node device 302 can comprise one or more computer and/or machine readable, writable, and/or executable components and/or instructions that, when executed by the processor 306, can facilitate performance of operations defined by such component(s) and/or instruction(s). Further, in numerous embodiments, any component associated with the network node device 302, as described herein with or without reference to the various figures of the subject disclosure, can comprise one or more computer and/or machine readable, writable, and/or executable components and/or instructions that, when executed by the processor 306, can facilitate performance of operations defined by such component(s) and/or instruction(s). For example, the request receiving component 310, and/or any other components associated with the network node device 302 (e.g., communicatively, electronically, and/ or operatively coupled with and/or employed by network node device 302), can comprise such computer and/or machine readable, writable, and/or executable component(s) and/or instruction(s). Consequently, according to numerous embodiments, the network node device 302 and/or any components associated therewith, can employ the processor 306 to execute such computer and/or machine readable, writable, and/or executable component(s) and/or instruction(s) to facilitate performance of one or more operations described herein with reference to the network node device 302 and/or any such components associated therewith.

In some embodiments, the network node device 302 can facilitate performance of operations related to and/or executed by the components of network node device 302, for example, the processor 306, the memory 304, the request receiving component 310, the application and setting component 312, and the transmit adjustment component 314. For example, as described in detail below, the network node device 302 can facilitate: receiving (e.g. the request receiving component 310) a request to adjust an uplink power limit (e.g., maximum power value) of a first communication device that is generating an uplink interference above a threshold and a power adjustment value employable to adjust the uplink power limit of the first communication device; identifying (e.g., by the application and setting component 312) a packet flow in an uplink communication with the first communication device, wherein use of the packet flow results in the generating of the uplink interference above the threshold; determining (e.g., by the application and setting component 312) whether the uplink power limit of the first communication device is able to be adjusted based on a quality of service allocated to the packet flow; and in response to the determining that the uplink power limit of the first communication device is able to be adjusted, transmitting (e.g., by the transmit adjustment component 314) a message to update the uplink power limit of the first communication device using the power adjustment value.

In some embodiments, the device and the request receiving component 310 can comprise one or more processors, memory, and electrical circuitry. In some embodiments, the request receiving component 310 can receiving a request to adjust an uplink power limit of a first communication device that is generating an uplink interference above a threshold and a power adjustment value employable to adjust the uplink power limit of the first communication device. In some embodiments, the centralized control element 250 can monitor the total UL aggregated interference. If the total UL aggregated interference reaches or surpasses a threshold, the centralized control element 250 can identify the network node devices and communication devices are impacting the interference request adjustment. In some embodiments, the centralized control element 250 can identify one or more communication devices to adjust the power control value in order to reduce interference into the external system. For example, as illustrated in FIG. 2, UE-3 102*c* and UE-4 102*d*. In some embodiments, the centralized control element 250 may identify one that would have greatest impact on total UL aggregated interference is UP transmit power was reduced (for example, UE-3 102*c* in FIG. 2). The centralized control element 250 can calculate a power adjustment (e.g., an update maximum UL transmit power value a UE can use, P_Max value), based on assumption that the communication device is transmitting using the maximum power. In some embodiments, the network node (e.g., eNB-2 104*b* in FIG. 2) that is serving the communication device (e.g., UE-3 102*c*), receives the power adjustment from the centralized control element 250 so that uplink power limit of the communication device can be adjusted.

In some embodiments, the application and setting component 312, can comprise one or more processors, memory, and electrical circuitry. In some embodiments, the application and setting component 312 can identify the packet flow in an uplink communication with the first communication device that is causing interference. In some embodiments, the network node can interpret information from the UE, such as packet flow characteristics the UE engaged in and whether that activity is causing the interference. For example, the network node device 302 (e.g. eNB) can get information (e.g., using power headroom information/report and/or power control commands) from the communication devices (e.g., UE) to determine/interpret, but not limited to, the type of packet flow the UE is using, the UL transmit power value being used for the packet flow, and/or a quality service indicator (e.g., level of service and requirement for maintaining quality level) assigned to the packet flow. In some embodiments, once the network node device 302 has identified a UE that is causing interference into the external system, the network node device 302 can determine (e.g. from power headroom information received from the UE) the packet flow type being used that is causing the interference. In some embodiments, depending on the type of packet flow being used by the UE, the network node device 302 can utilize power control commands to modify uplink power settings of the UE (e.g., reduce/adjust uplink power limit). The network node device 302 can determine if the usage of the packet flow is causing interference and whether the interference is above a threshold. In some embodiments, the application and setting component 312 can further determine whether the uplink power limit of the first communication device is able to be adjusted based on a quality of service allocated to the packet flow. In some wireless communication systems, certain packet flows are given a high priority (e.g., a high numerical value for quality of service), such as FaceTime or video calls that require the highest quality of service to provide good user experience. In order to get the highest quality of service, maximum power may be required. In some embodiments, a UE that is engaged in video call but is farther from a network node and closer to the external system, that UE may be generating high interference into the external system because the UE is allowed to transmit at maximum UL transmit power. Lowering the UL transmit power for this UE would lower user experience, as the video may flicker or pause. In this case, the network node may determine that adjusting uplink power limit may not be possible. However, if the UE is engaged in email applications or photo upload, the uplink power limit may be modified without sacrificing user experience.

In some embodiments, the transmit adjustment component 314, can comprise one or more processors, memory, and electrical circuitry. In some embodiments, in response to network node determining that the uplink power limit of the first communication device is able to be adjusted (e.g., engaged in applications that have lower quality of service requirements or the power adjustment would not cause degradation in user experience), the transmit adjustment component 314, using communication components (not shown) can transmit a message to update the uplink power limit of the first communication device using the power adjustment value. In some embodiments, the network node device 302 can transmit a message to adjust the P_Max value of the UE. In some embodiments, the network node device 302 may utilize open loop power control procedure to modify the uplink power limit. For example, the eNB transmits a paging message with systemInfoModification=true. Thereafter, the eNB transmits an updated SIB1 (e.g., P_MAX=20 dbm). The Paging message is used to inform UEs in RRC_IDLE and UEs in RRC_CONNECTED about a system information change. UE then reads and decodes the new SIB1 message and change its setting accordingly.

Figure 4:
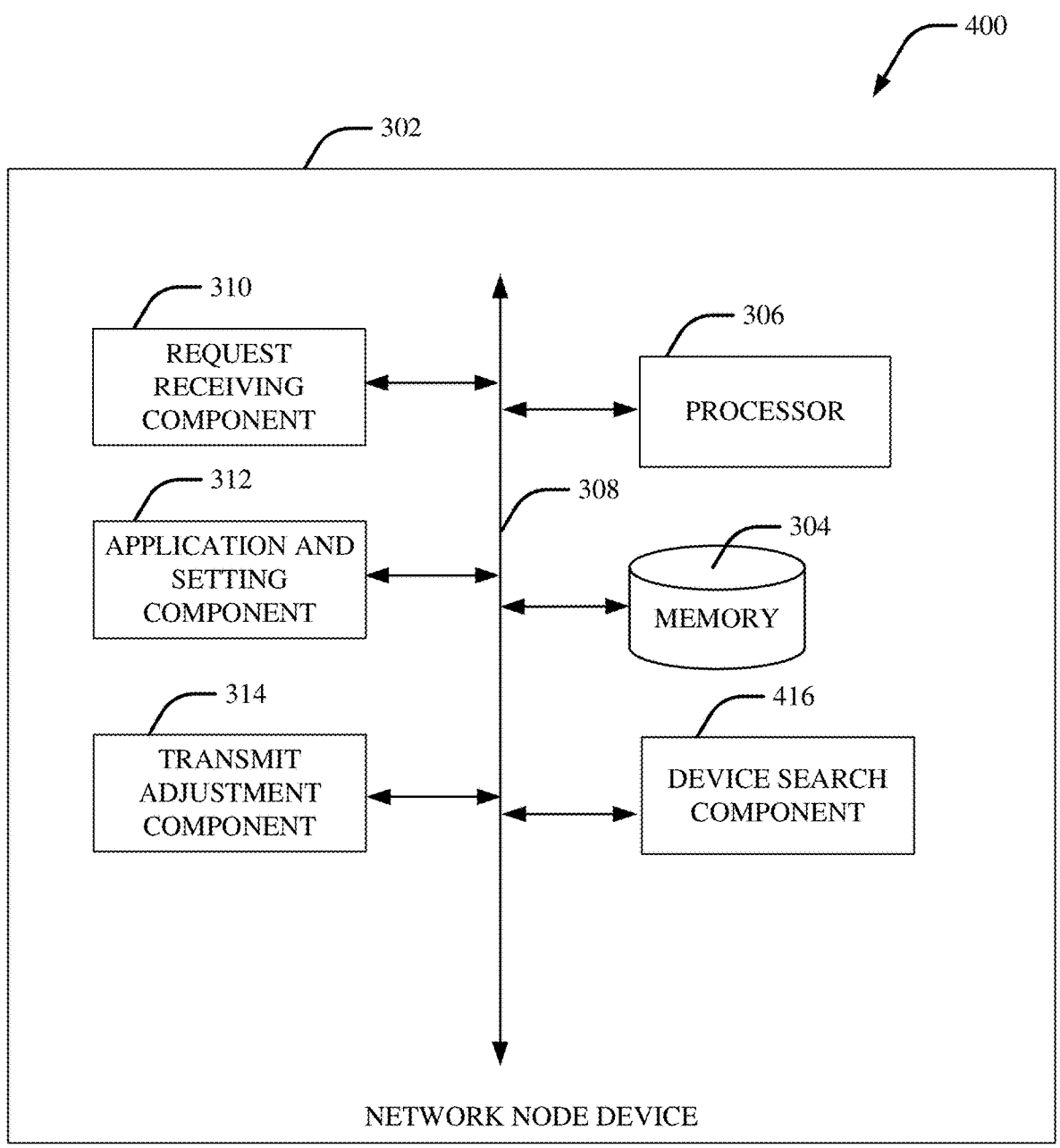
FIG. 4 illustrates a block diagram of an example, non-limiting system that facilitates uplink interference avoidance in accordance with one or more embodiments described herein.

FIG. 4 illustrates a block diagram of an example, non-limiting system 400 that facilitates uplink interference avoidance in accordance with one or more embodiments described herein. Repetitive description of like elements employed in respective embodiments is omitted for sake of brevity. According to several embodiments, the system 400 can comprise the network node device 302. In some embodiments, the network node device 302 can further comprise a device search component 416.

In some embodiments, the device search component 416, can comprise one or more processors, memory, and electrical circuitry. In some embodiments. In some embodiments, the device search component 416, in response to determining that the uplink power limit of the first communication device is unable to be adjusted, can initiate a search to identify a second communication device that is engaged in an uplink transmission. In some embodiments, the first communication device may be engaged in use of an application type, for example, FaceTime, having a high quality of service class identifier (e.g., QCI=12). The quality of service can be available to the network node device 302. In some embodiments, the network node device 302 knowing that the quality of service is above a threshold such that up link setting of the first communication may not be adjusted, the device search component 416 initiates a search to identify another communication that is engaged in uplink communication and generating interference (e.g. UE-4 102d in FIG. 2). In some embodiments, the device search component 416 can identity group of additional communication devices having the uplink interference into an external system. In some embodiments, not all the devices need to directly cause interference into the external device. If the device is engaged in uplink transmission, it may be eligible for reduction in uplink transmit power if the uplink power limit of communication devices causing interference cannot be adjusted. In some embodiments, the device search component 416 in response to the determining that the uplink power limit of the first communication device is unable to be adjusted, evaluating a location value, uplink power control value, and a quality of service class identifier value associated with an active application of additional communication devices having the uplink interference into an external system. For example, the network node device 302 can evaluate location of the all the devices engaged in uplink transmission generating an interference. If the device is closer to the external system and has lower QCI value (e.g. QCI=4), then that device is eligible for adjustment to their uplink power limit. The network node device 302 may track and/or prioritize one or more communication devices eligible for uplink power limit adjustment.

Figure 5:
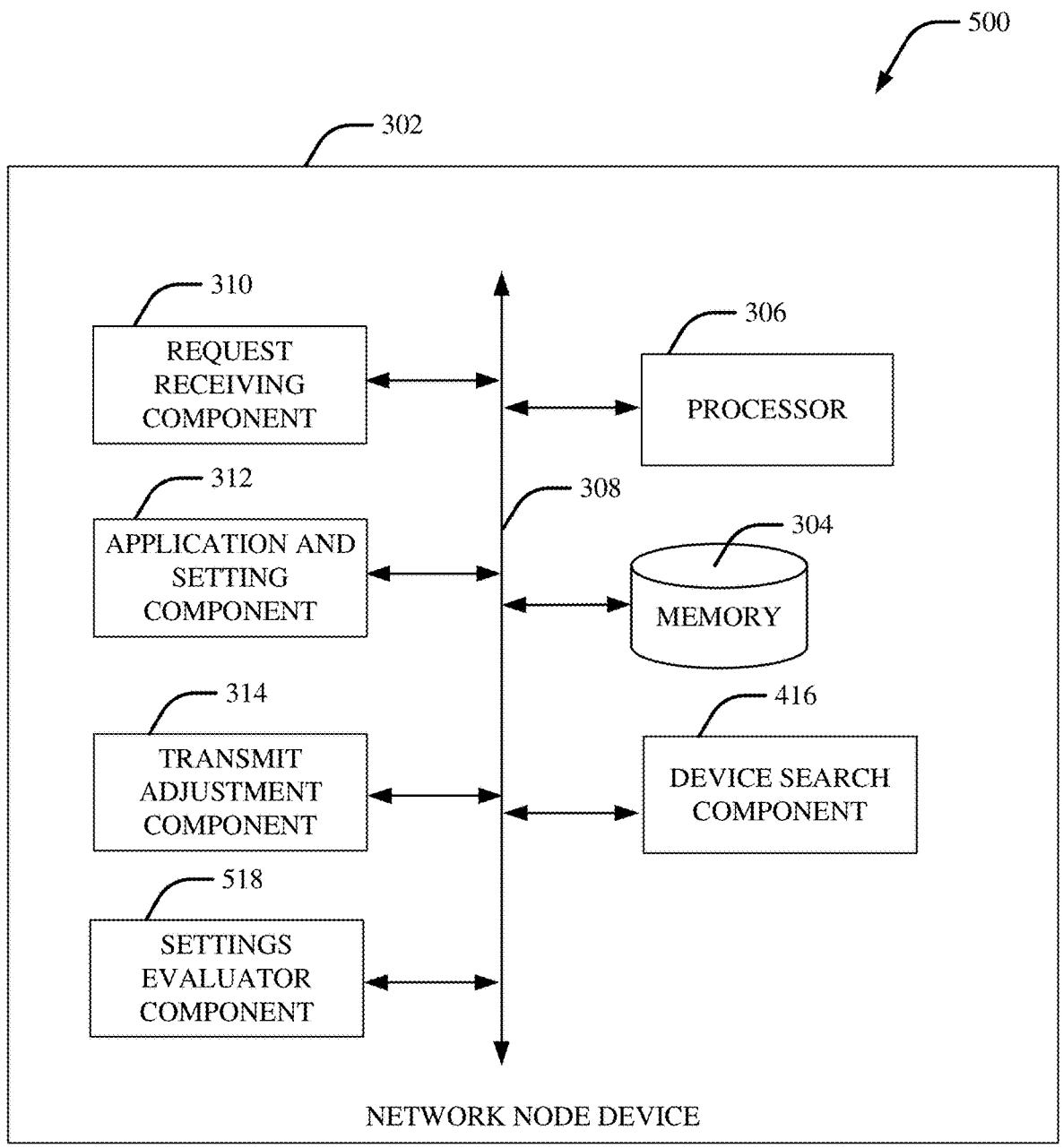
FIG. 5 illustrates a block diagram of an example, non-limiting system that facilitates uplink interference avoidance in accordance with one or more embodiments described herein.

FIG. 5 illustrates a block diagram of an example, non-limiting system 500 that facilitates uplink interference avoidance in accordance with one or more embodiments described herein. Repetitive description of like elements employed in respective embodiments is omitted for sake of brevity. According to several embodiments, the system 500 can comprise the network node device 302. In some embodiments, the network node device 302 can further comprise a settings evaluator component 518.

In some embodiments, the settings evaluator component 518 can comprise one or more processors, memory, and electrical circuitry. In some embodiments. In some embodiments, the settings evaluator component 518 can evaluate communication device settings to determine if the communication device is eligible for uplink power limit adjustment. This is in contrast to open loop power control. Having a feedback from UE, the network node device 302 using the settings evaluator component 518 can identify alternate communication devices for avoiding uplink interference. In some embodiments, the settings evaluator component 518 can evaluate additional settings if the quality of service class indicator value is the same for two communication devices generating interference. In some embodiments, the settings evaluator component 518 can evaluating a quality of service class identifier value of the first communication device and a quality of service class identifier value of the second communication device to determine whether an uplink power setting of the second communication device is able to be adjusted. In some embodiments, in response to the first quality of service class identifier value being determined to be equal to the second quality of service class identifier of the second communication device, the settings evaluator component 518 can evaluate a first alternate uplink power limit value of the first communication device and a second alternate uplink power limit value of the second communication device in order to reduce uplink interference.

Figure 6:
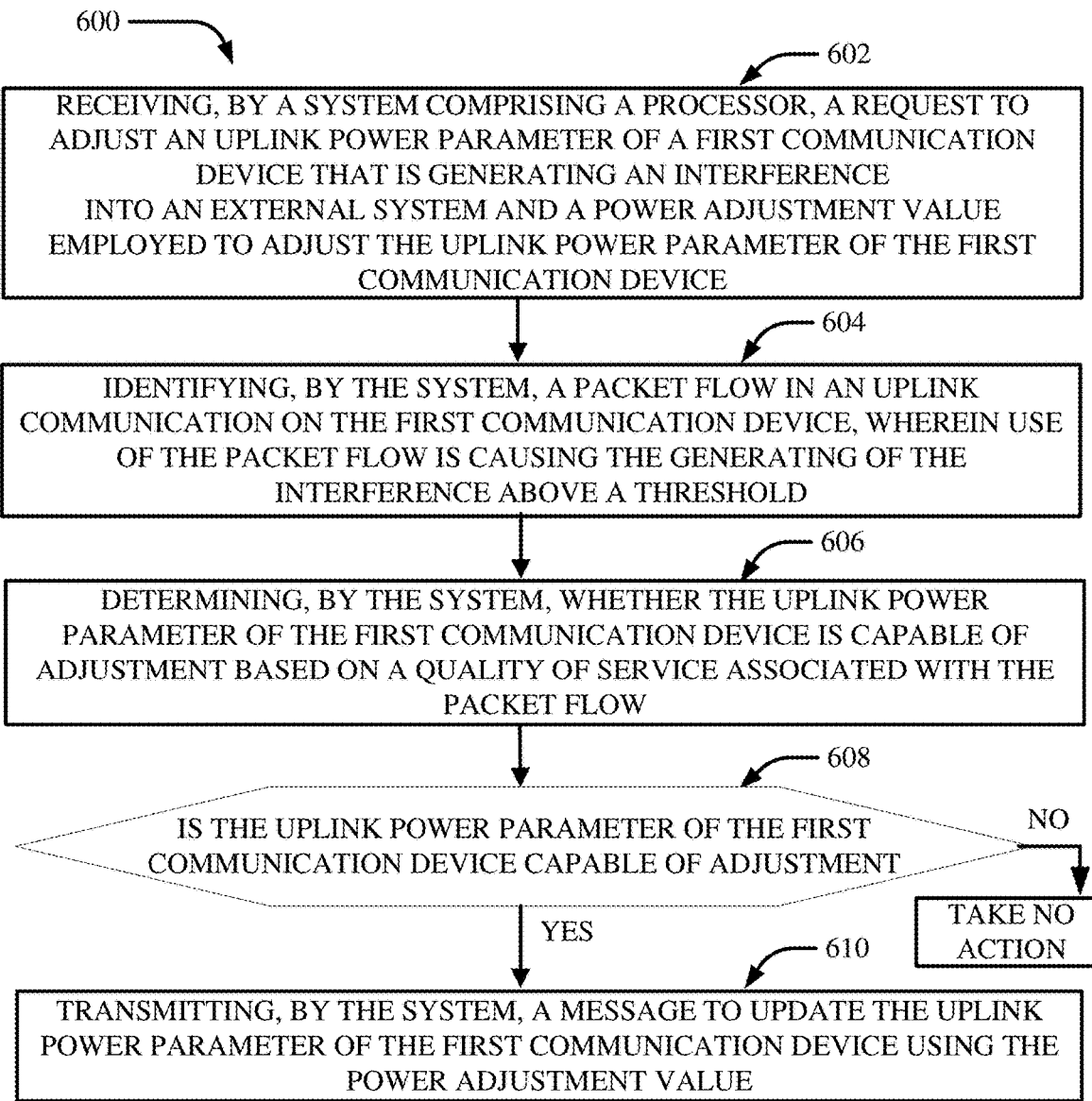
FIG. 6 depicts a diagram of an example, non-limiting computer implemented method that facilitates uplink interference avoidance under closed loop power control conditions in accordance with one or more embodiments described herein.

FIG. 6 depicts a diagram of an example, non-limiting computer implemented method that facilitates uplink interference under a closed loop power control conditions in accordance with one or more embodiments described herein. Repetitive description of like elements employed in other embodiments described herein is omitted for sake of brevity. In some examples, flow diagram 600 can be implemented by operating environment 1100 described below. It can be appreciated that the operations of flow diagram 600 can be implemented in a different order than is depicted.

In non-limiting example embodiments, a computing device (or system) (e.g., computer 1200) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts receiving, by a system comprising a processor, a request to adjust an uplink power parameter (e.g. an uplink power control parameter or uplink power limit parameter) of a first communication device that is generating an interference into an external system and a power adjustment value employed to adjust the uplink power parameter of the first communication device. Operation 604 depicts identifying, by the system, a packet flow in an uplink communication on the first communication device, wherein engagement of the packet flow is causing the generating of the interference above a threshold. Operation 606 depicts determining, by the system, whether the uplink power parameter (e.g., uplink power limit) of the first communication device is capable of adjustment (e.g., determining if uplink power limit can be reduced) based on a quality of service associated with the packet flow. Operation 608 depicts determining if the uplink power parameter of the first communication device is capable of adjustment (e.g., determining if uplink power limit can be reduced), then perform operation 610. Otherwise, take no action (e.g., perform operation 710 of FIG. 7 and/or operation 1010 of FIG. 10). Operation 610 depicts, in response to the determining that the uplink power parameter of the first communication device is capable of the adjustment, transmitting, by the system, a message to update the uplink power parameter (e.g., reduce uplink power limit) of the first communication device using the power adjustment value.

Figure 7:
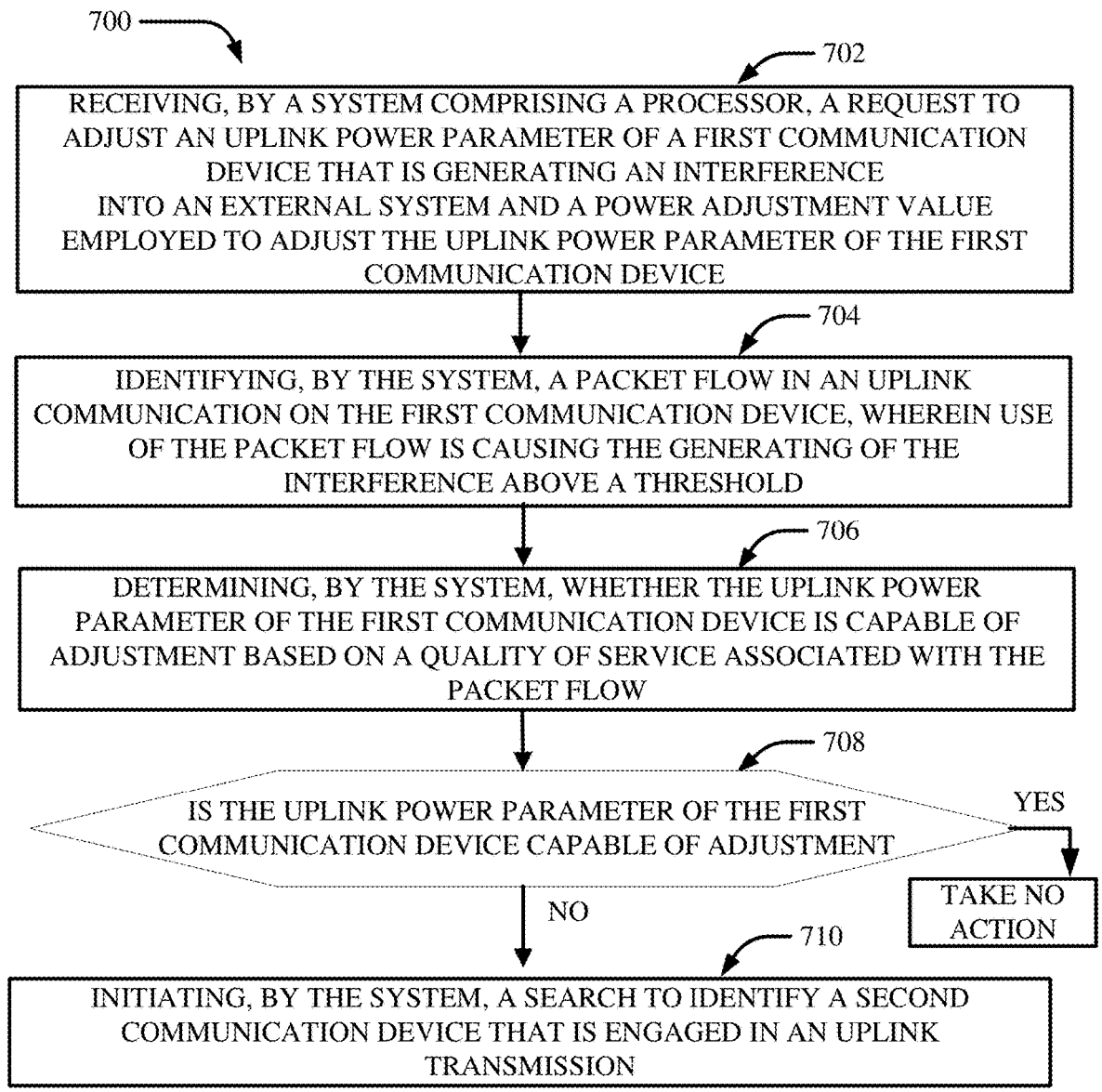
FIG. 7 depicts a diagram of an example, non-limiting computer implemented method that facilitates uplink interference avoidance under closed loop power control conditions in accordance with one or more embodiments described herein.

FIG. 7 depicts a diagram of an example, non-limiting computer implemented method that facilitates uplink interference under a closed loop power control conditions in accordance with one or more embodiments described herein. Repetitive description of like elements employed in other embodiments described herein is omitted for sake of brevity. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1200) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts receiving, by a system comprising a processor, a request to adjust an uplink power parameter (e.g. an uplink power control parameter or uplink power limit parameter) of a first communication device that is generating an interference into an external system and a power adjustment value employed to adjust the uplink power parameter of the first communication device. Operation 704 depicts identifying, by the system, a packet flow in an uplink communication on the first communication device, wherein engagement of the packet flow is causing the generating of the interference above a threshold. Operation 706 depicts determining, by the system, whether the uplink power parameter (e.g., uplink power limit) of the first communication device is capable of adjustment (e.g., determining if uplink power limit can be reduced) based on a quality of service associated with the packet flow. Operation 708 depicts determining if the uplink power parameter of the first communication device is not capable of adjustment, then perform operation 710. Otherwise, take no action and continue monitoring the connection (e.g., perform operation 610 of FIG. 6). Operation 710 depicts, in response to the determining that the uplink power parameter of the first communication device is not capable of adjustment, initiating, by the system, a search to identify a second communication device that is engaged in an uplink transmission.

Figure 8:
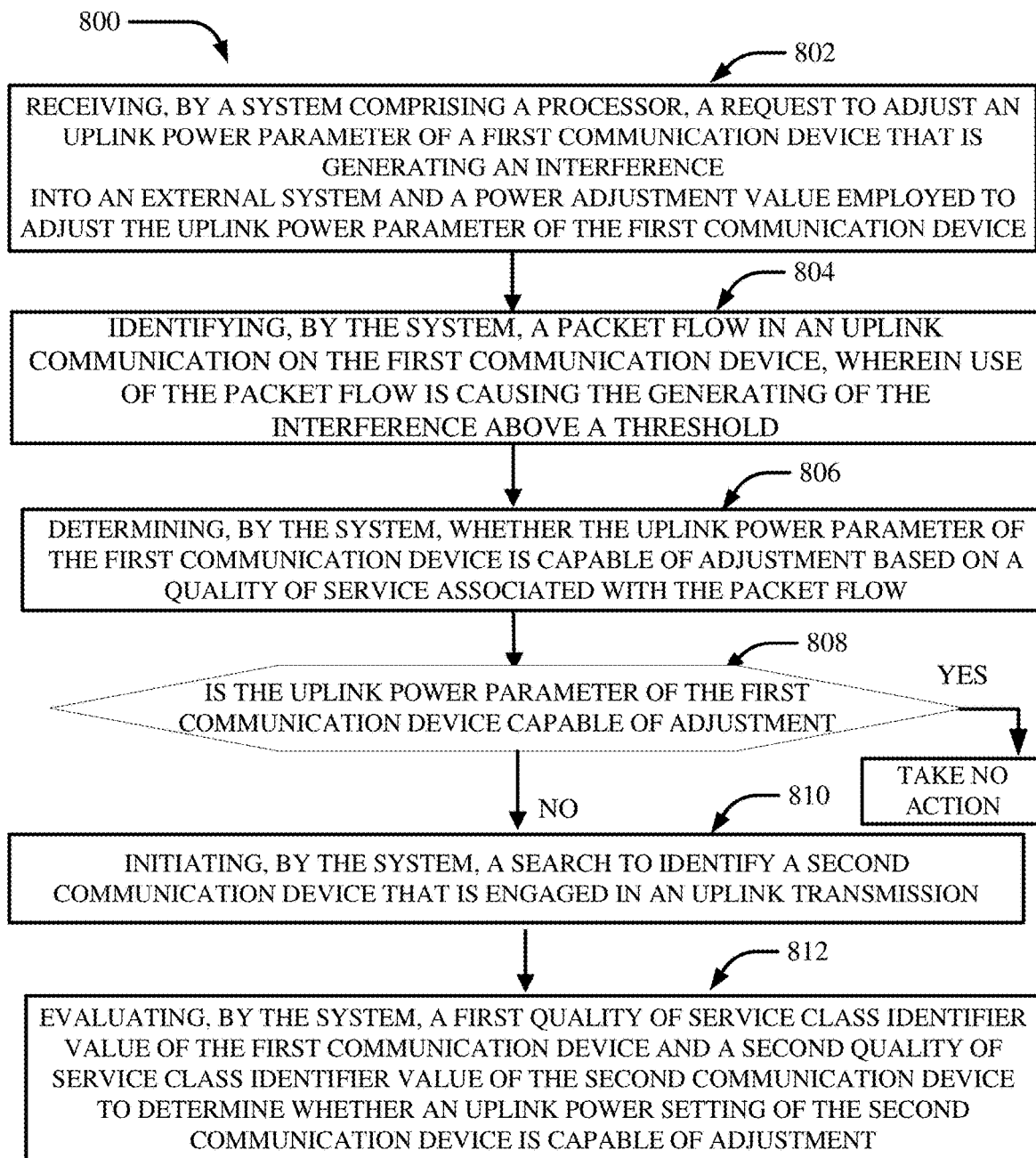
FIG. 8 depicts a diagram of an example, non-limiting computer implemented method that facilitates uplink interference avoidance under closed loop power control conditions in accordance with one or more embodiments described herein.

FIG. 8 depicts a diagram of an example, non-limiting computer implemented method that facilitates uplink interference under a closed loop power control conditions in accordance with one or more embodiments described herein. Repetitive description of like elements employed in other embodiments described herein is omitted for sake of brevity. In some examples, flow diagram 800 can be implemented by operating environment 1200 described below. It can be appreciated that the operations of flow diagram 800 can be implemented in a different order than is depicted.

In non-limiting example embodiments, a computing device (or system) (e.g., computer 1200) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving, by a system comprising a processor, a request to adjust an uplink power parameter (e.g. an uplink power control parameter or uplink power limit parameter) of a first communication device that is generating an interference into an external system and a power adjustment value employed to adjust the uplink power parameter of the first communication device. Operation 804 depicts identifying, by the system, a packet flow in an uplink communication on the first communication device, wherein engagement of the packet flow is causing the generating of the interference above a threshold. Operation 806 depicts determining, by the system, whether the uplink power parameter (e.g., uplink power limit) of the first communication device is capable of adjustment (e.g., determining if uplink power limit can be reduced) based on a quality of service associated with the packet flow. Operation 808 depicts determining if the uplink power parameter of the first communication device is not capable of adjustment, then perform operation 810. Otherwise, take no action and continue monitoring the connection (e.g., perform operation 610 of FIG. 6). Operation 810 depicts, in response to the determining that the uplink power parameter of the first communication device is not capable of adjustment, initiating, by the system, a search to identify a second communication device that is engaged in an uplink transmission. Operation 812 depicts evaluating, by the system, a first quality of service class identifier value of the first communication device and a second quality of service class identifier value of the second communication device to determine whether an uplink power setting of the second communication device is capable of adjustment.

Figure 9:
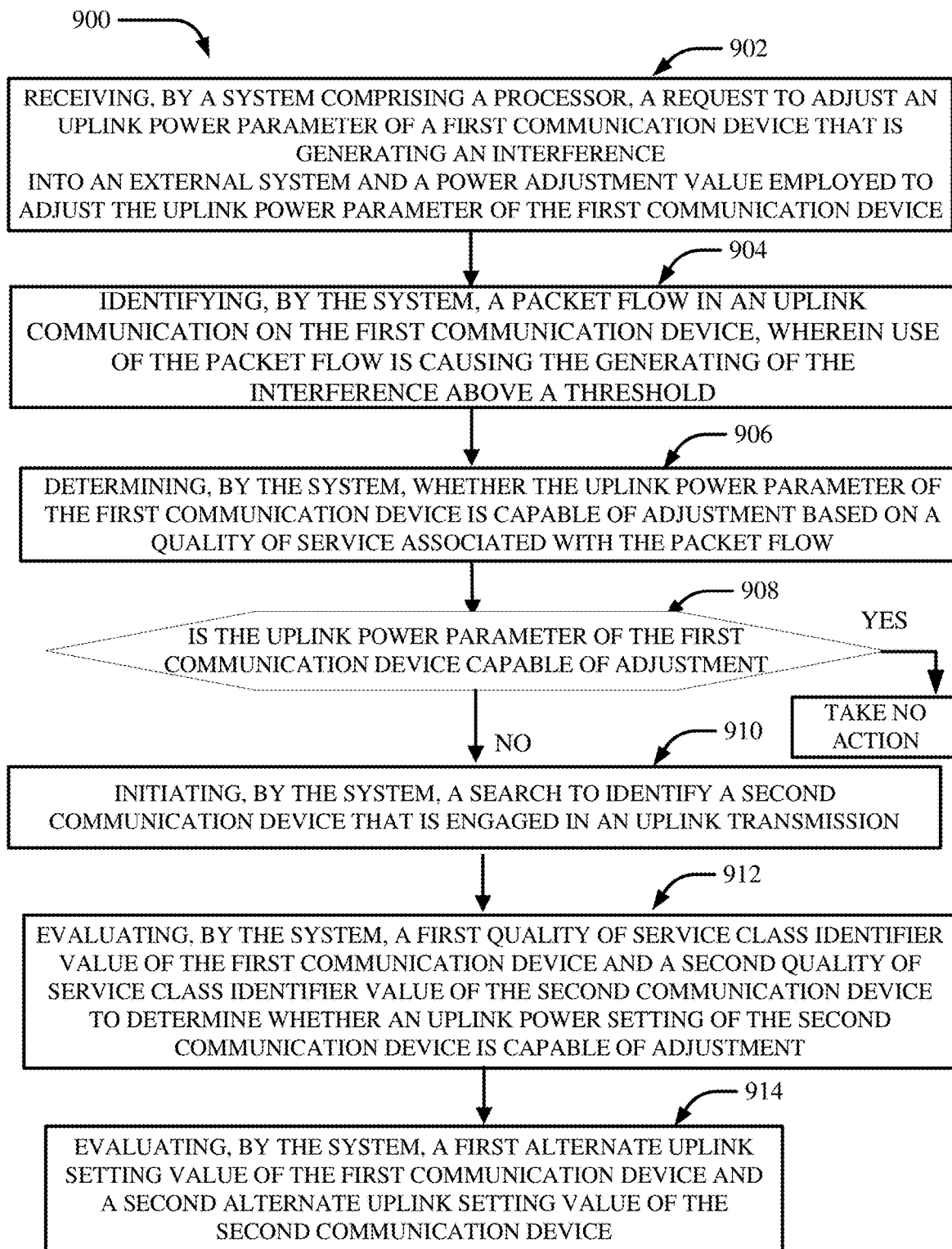
FIG. 9 depicts a diagram of an example, non-limiting computer implemented method that facilitates uplink interference avoidance under closed loop power control conditions in accordance with one or more embodiments described herein.

FIG. 9 depicts a diagram of an example, non-limiting computer implemented method that facilitates uplink interference under a closed loop power control conditions in accordance with one or more embodiments described herein. Repetitive description of like elements employed in other embodiments described herein is omitted for sake of brevity. In some examples, flow diagram 900 can be implemented by operating environment 1200 described below. It can be appreciated that the operations of flow diagram 900 can be implemented in a different order than is depicted.

In non-limiting example embodiments, a computing device (or system) (e.g., computer 1200) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving, by a system comprising a processor, a request to adjust an uplink power parameter (e.g. an uplink power control parameter or uplink power limit parameter) of a first communication device that is generating an interference into an external system and a power adjustment value employed to adjust the uplink power parameter of the first communication device. Operation 904 depicts identifying, by the system, a packet flow in an uplink communication on the first communication device, wherein engagement of the packet flow is causing the generating of the interference above a threshold. Operation 906 depicts determining, by the system, whether the uplink power parameter (e.g., uplink power limit) of the first communication device is capable of adjustment (e.g., determining if uplink power limit can be reduced) based on a quality of service associated with the packet flow. Operation 908 depicts determining if the uplink power parameter of the first communication device is not capable of adjustment, then perform operation 910. Otherwise, take no action and continue monitoring the connection (e.g., perform operation 610 of FIG. 6). Operation 910 depicts, in response to the determining that the uplink power parameter of the first communication device is not capable of adjustment, initiating, by the system, a search to identify a second communication device that is engaged in an uplink transmission. Operation 912 depicts evaluating, by the system, a first quality of service class identifier value of the first communication device and a second quality of service class identifier value of the second communication device to determine whether an uplink power setting of the second communication device is capable of adjustment. Operation 914 depicts, where the first quality of service class identifier value is equal to the second quality of service class identifier of the second communication device, evaluating, by the system, a first alternate uplink power limit value of the first communication device and a second alternate uplink power limit value of the second communication device.

Figure 10:
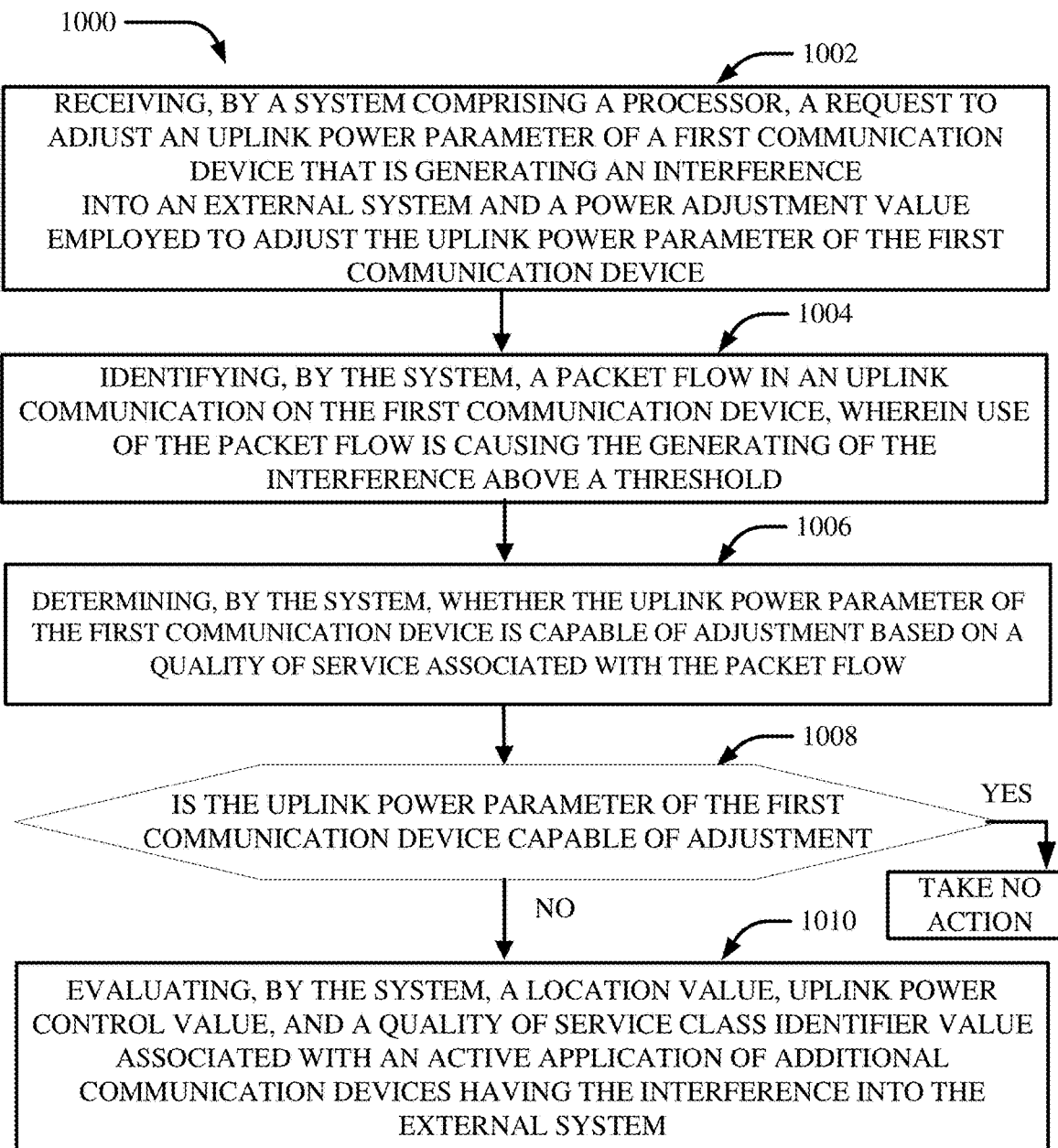
FIG. 10 depicts a diagram of an example, non-limiting computer implemented method that facilitates uplink interference avoidance under closed loop power control conditions in accordance with one or more embodiments described herein.

FIG. 10 depicts a diagram of an example, non-limiting computer implemented method that facilitates uplink interference under a closed loop power control conditions in accordance with one or more embodiments described herein. Repetitive description of like elements employed in other embodiments described herein is omitted for sake of brevity. In some examples, flow diagram 1000 can be implemented by operating environment 1200 described below. It can be appreciated that the operations of flow diagram 1000 can be implemented in a different order than is depicted.

In non-limiting example embodiments, a computing device (or system) (e.g., computer 1200) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 receiving, by a system comprising a processor, a request to adjust an uplink power parameter (e.g. an uplink power control parameter or uplink power limit parameter) of a first communication device that is generating an interference into an external system and a power adjustment value employed to adjust the uplink power parameter of the first communication device. Operation 1004 depicts identifying, by the system, a packet flow in an uplink communication on the first communication device, wherein engagement of the packet flow is causing the generating of the interference above a threshold. Operation 1006 depicts determining, by the system, whether the uplink power parameter (e.g., uplink power limit) of the first communication device is capable of adjustment (e.g., determining if uplink power limit can be reduced) based on a quality of service associated with the packet flow. Operation 1008 depicts determining if the uplink power parameter of the first communication device is not capable of adjustment, then perform operation 1010. Otherwise, take no action and continue monitoring the connection (e.g., perform operation 610 of FIG. 6). Operation 1010 depicts in response to the determining that the uplink power parameter of the first communication device is not capable of adjustment, initiating, by the system, a search to identify a second communication device that is engaged in an uplink transmission. Operation 1010 depicts, in response to the determining that the uplink power parameter of the first communication device is not capable of adjustment, evaluating, by the system, a location value, uplink power control value, and a quality of service class identifier value associated with an active application of additional communication devices having the interference into the external system.

Figure 11:
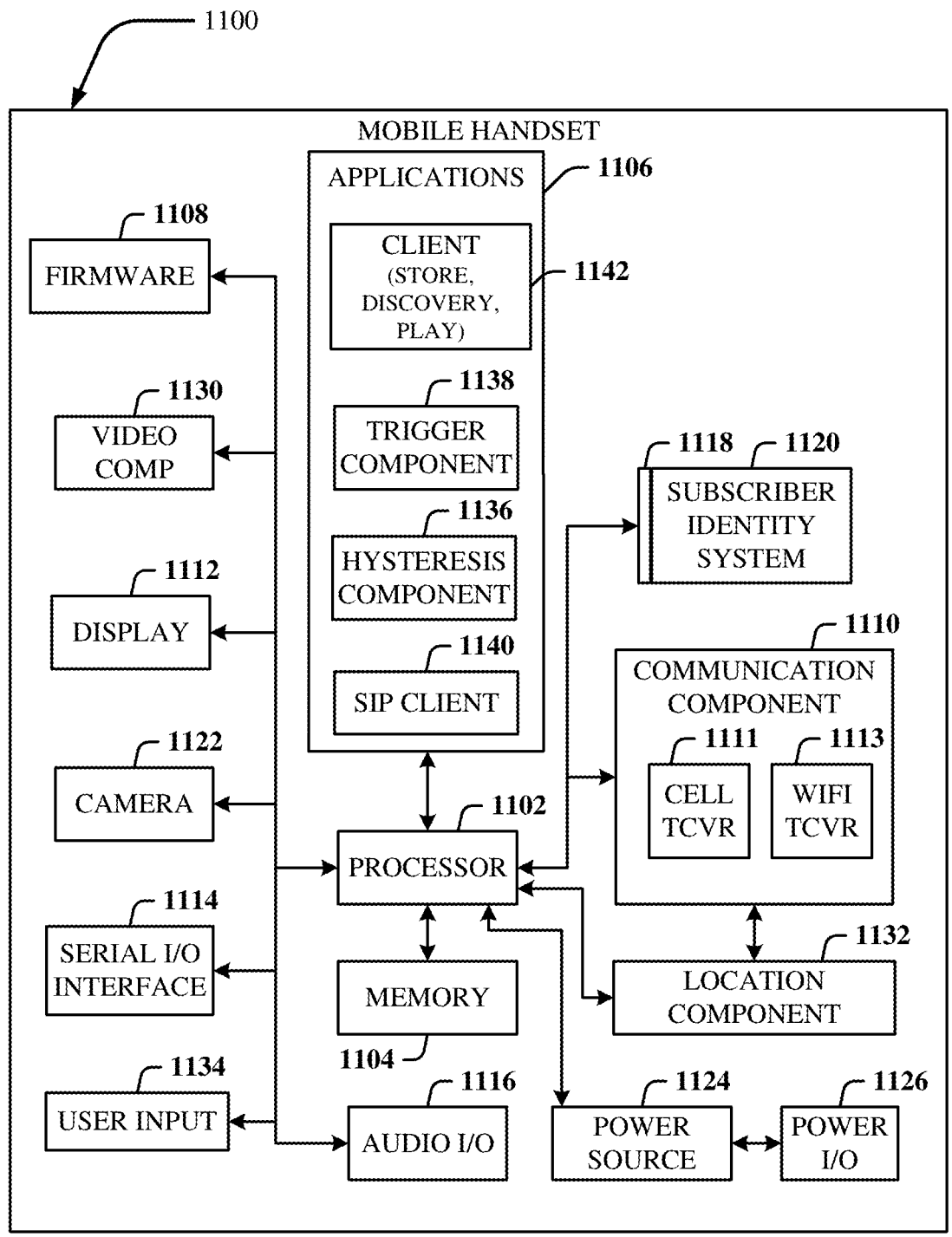
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals.

The applications 1106 can be stored in the memory 1104 and/or in a firmware 1108 and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120 and interfacing the SIM card 1120 with the processor 1102. However, it is to be appreciated that the SIM card 1120 can be manufactured into the handset 1100 and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
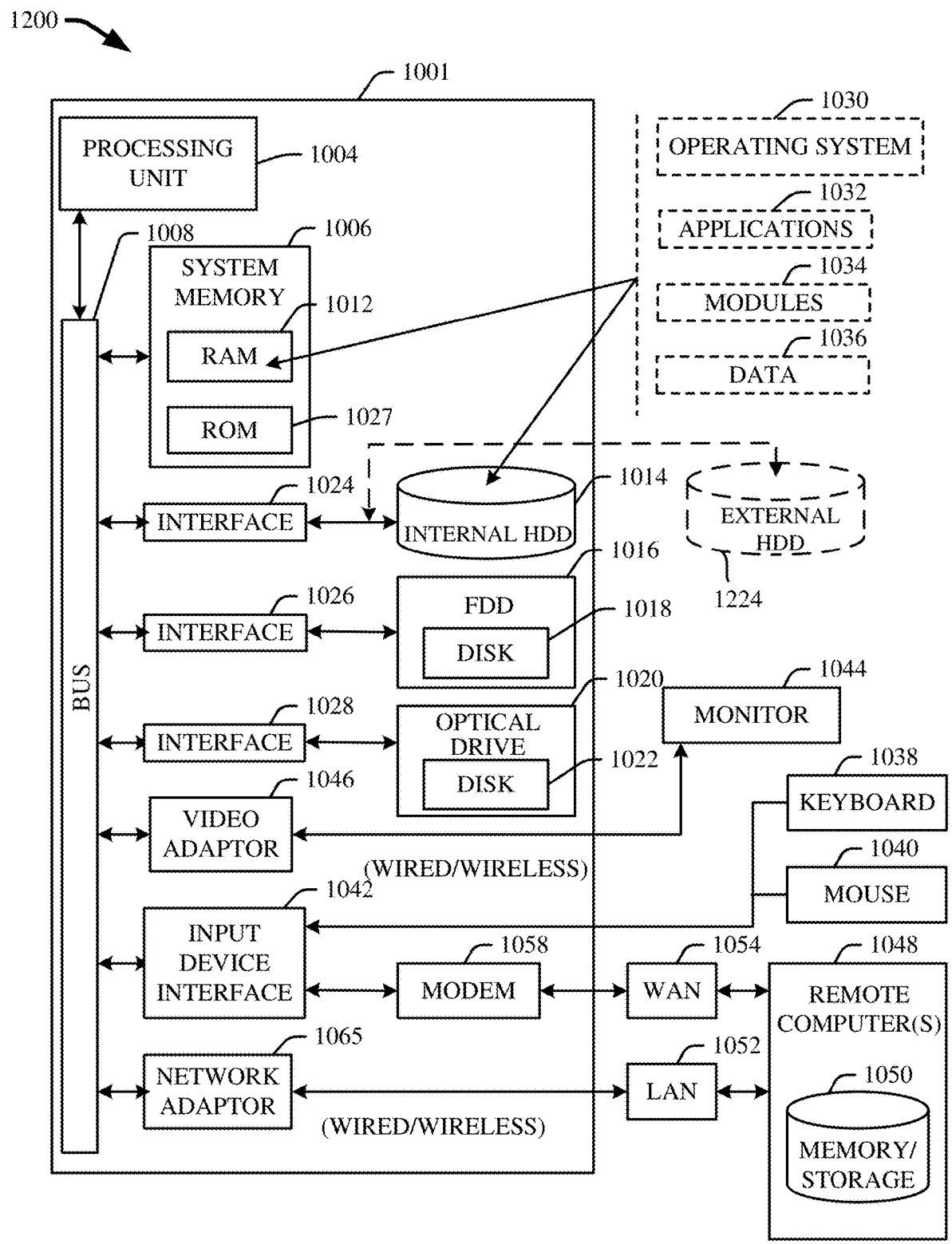
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1200, which can be, for example, part of the hardware of system 1220, includes a processing unit 1214, a system memory 1206, and a system bus 1218. System bus 1218 couples system components including, but not limited to, system memory 1206 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1294), and Small Computer Systems Interface (SCSI).

System memory 1206 can include volatile memory 1220 and nonvolatile memory 1222. A basic input/output system (BIOS), containing routines to transfer information between elements within computer 1200, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM 1212, which acts as external cache memory. By way of illustration and not limitation, RAM 1212 is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1200 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer 1200. System applications 1230 take advantage of the management of resources by operating system 1228 through program modules 1232 and program data 1234 stored either in system memory 1206 or on disk storage 1224. It is to be noted that the disclosed subject matter can be implemented with various operating systems or combinations of operating systems.

A user can enter commands or information into computer 1200 through input device(s) 1236. As an example, a mobile device and/or portable device can include a user interface embodied in a touch sensitive display panel allowing a user to interact with computer 1200. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1200 and to output information from computer 1200 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1200 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1200.

For purposes of brevity, only a memory storage device 1246 is illustrated with remote computer(s) 1244. Remote computer(s) 1244 is logically connected to computer 1200 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1200, it can also be external to computer 1200. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

Performing aggregation above the RLC makes it possible to perform the routing and aggregation at the same protocol sublayer. Thus, additional possibilities in terms of taking into account routing information while performing bearer aggregation can be used to facilitate a more efficient system. Additionally, it also reduces the impact on standards for lower protocol stack layers. Similarly, the benefits of performing aggregation below the RLC are that it can reduce the demand for LCID space extension when trying to support 1:1 mapping of UE bearers to backhaul channels.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:
1. A system, comprising:
    a processor; and
    a memory that stores executable instructions that, when executed by the processor, facilitate performance of operations, comprising:
    identifying a packet flow in an uplink communication with a first communication device, wherein use of the packet flow results in generating uplink interference from the first communication device above the threshold; and
    in response to determining that an uplink power limit of the first communication device is adjustable based on a quality of service class identifier value allocated to the packet flow, transmitting a message to update the uplink power limit of the first communication device using a power adjustment value, wherein the class identifier value is associated with a content type of the packet flow.

2. The system of claim 1, wherein the operations further comprise:
    in response to determining that the uplink power limit of the first communication device is unable to be adjusted, initiating a search to identify a second communication device that is engaged in an uplink transmission.

3. The system of claim 2, wherein the operations further comprise:
    evaluating a first quality of service class identifier value of the first communication device and a second quality of service class identifier value of the second communication device to determine whether an uplink power setting of the second communication device is adjustable.

4. The system of claim 3, wherein the operations further comprise:
in response to the first quality of service class identifier value being determined to be equal to the second quality of service class identifier of the second communication device, evaluating a first alternate parameter of the first communication device and a second alternate uplink power parameter of the second communication device.

5. The system of claim 1, wherein the power adjustment value comprises an uplink power correction value that facilitates reducing the uplink interference generated by the first communication device.

6. The system of claim 1, wherein the operations further comprise:
in response to the determining that the uplink power limit of the first communication device is unable to be adjusted, identifying a group of additional communication devices having the uplink interference with respect to an external system.

7. The system of claim 1, wherein the operations further comprise:
in response to the determining that the uplink power limit of the first communication device is unable to be adjusted, evaluating a location value, an uplink power control value, and a quality of service class identifier value associated with an active application of additional communication devices having the uplink interference with respect to an external system.

8. A method, comprising:
identifying, by network equipment comprising a processor, a packet flow in an uplink communication with a first communication device, wherein use of the packet flow results in generating of uplink interference from the first communication device; and
in response to determining that an uplink power limit of the first communication device is able to be adjusted based on a quality of service class identifier value allocated to the packet flow, transmitting, by the system, a message to update the uplink power limit of the first communication device using a power adjustment value wherein the class identifier value is associated with a content type of the packet flow.

9. The method of claim 8, further comprising:
in response to determining that the uplink power limit of the first communication device is unable to be adjusted, initiating, by the network equipment, a search to identify a second communication device that is engaged in an uplink transmission.

10. The method of claim 9, further comprising:
evaluating, by the network equipment, a first quality of service class identifier value of the first communication device and a second quality of service class identifier value of the second communication device to determine whether an uplink power setting of the second communication device is able to be adjusted.

11. The method of claim 10, further comprising:
in response to the first quality of service class identifier value being determined to be equal to the second quality of service class identifier of the second communication device, evaluating, by the network equipment, a first alternate parameter of the first communication device and a second alternate uplink power parameter of the second communication device.

12. The method of claim 8, wherein the power adjustment value comprises an uplink power correction value that facilitates reducing the uplink interference generated by the first communication device.

13. The method of claim 8, further comprising:
in response to the determining that the uplink power limit of the first communication device is unable to be adjusted, identifying, by the network equipment, a group of additional communication devices having the uplink interference in association with an external system.

14. The method of claim 8, further comprising:
in response to the determining that the uplink power limit of the first communication device is unable to be adjusted, evaluating, by the network equipment, a location value, uplink power control value, and a quality of service class identifier value associated with an active application of additional communication devices having the uplink interference in association with an external system.

15. A non-transitory machine-readable medium, comprising executable instructions that, when executed by a processor, facilitate performance of operations, comprising:
identifying a packet flow in an uplink communication with a first user equipment, wherein use of the packet flow results in generating of uplink interference from the first user equipment above the threshold; and
in response to determining that an uplink power limit of the first user equipment is adjustable based on a quality of service class identifier value allocated to the packet flow and associated with a content type of the packet flow, transmitting a message to update the uplink power limit of the first user equipment using a power adjustment value.

16. The non-transitory machine-readable medium of claim 15, wherein the operations further comprise:
in response to determining that the uplink power limit of the first user equipment is unable to be adjusted, initiating a search to identify a second user equipment that is engaged in an uplink transmission.

17. The non-transitory machine-readable medium of claim 16, wherein the operations further comprise:
evaluating a first quality of service class identifier value of the first user equipment and a second quality of service class identifier value of the second user equipment to determine whether an uplink power setting of the second user equipment is adjustable.

18. The non-transitory machine-readable medium of claim 17, wherein the operations further comprise:
in response to the first quality of service class identifier value being determined to be equal to the second quality of service class identifier of the second user equipment, evaluating a first alternate parameter of the first user equipment and a second alternate uplink power parameter of the second user equipment.

19. The non-transitory machine-readable medium of claim 15, wherein the power adjustment value comprises an uplink power correction value that facilitates reducing the uplink interference generated by the first user equipment.

20. The non-transitory machine-readable medium of claim 15, wherein the operations further comprise:
in response to the determining that the uplink power limit of the first user equipment is unable to be adjusted, identifying a group of additional user equipment having generated the uplink interference into an external system.

* * * * *